M. BLASIUS.
VEHICLE SIGNAL.
APPLICATION FILED DEC. 15, 1916.
1,232,190.
Patented July 3, 1917.
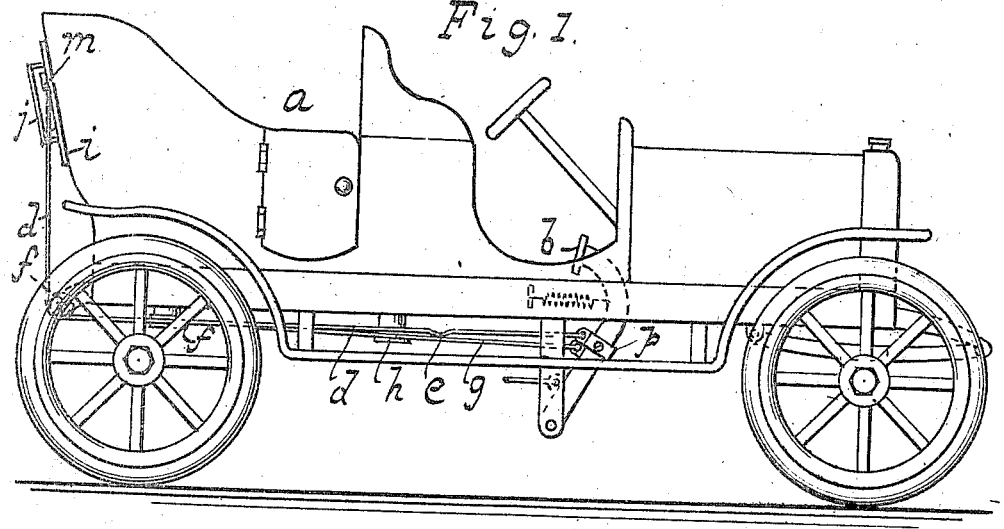
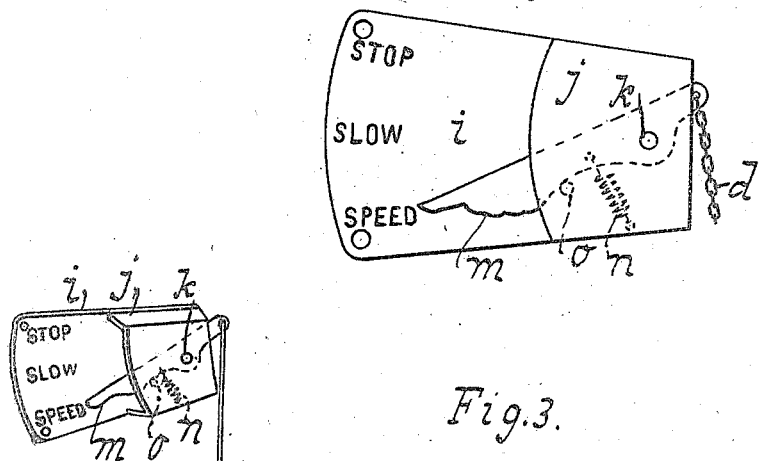
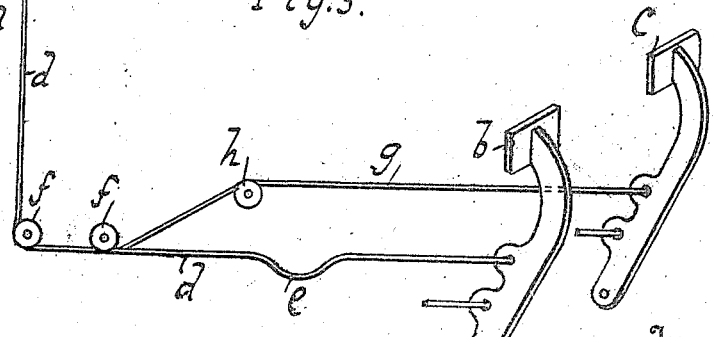
Inventor
Michael Blasius
By his Attorneys

UNITED STATES PATENT OFFICE.

MICHAEL BLASIUS, OF HOBOKEN, NEW JERSEY.

VEHICLE-SIGNAL.

1,232,190.  Specification of Letters Patent.  Patented July 3, 1917.

Application filed December 15, 1916. Serial No. 137,110.

*To all whom it may concern:*

Be it known that I, MICHAEL BLASIUS, a citizen of the United States, residing at 1221 Washington street, in the city of Hoboken, county of Hudson, State of New Jersey, have invented new and useful Improvements in Vehicle-Signals, of which the following is a specification.

This invention relates to a signal device which is essentially adapted to be applied to the rear portion of a self propelled vehicle where it will be visible to the chauffeur or driver of an approaching vehicle. The fundamental object of the invention is to provide a device which can readily be attached to any car and will automatically operate by the actuation of the brake or speed change gear.

The present invention comprehends a signal arm swingingly mounted on the rear of the vehicle normally set at full speed, but when the speed clutch lever is operated to slow the vehicle the signal arm will be actuated to point toward the slow speed, and finally when the brake lever is operated the arm will be moved to point toward the word "Stop" inscribed on the sign. In this invention the flexible connection between the swinging signal arm and the levers is branched to connect the two levers with the signal, so that either lever when operated will move the signal arm the required distance. It is well known in automobile construction that the clutch lever for diminishing the speed and the brake lever for stopping the speed move about the same distance or arc when operated. In order to transmit variable motion to the indicator arm a bight in the flexible connection between the clutch lever and the indicator will take up some of the motion of the lever and swing the indicator arm in a smaller arc.

The novel features of the invention are more fully described in the following specification and claims and illustrated in the accompanying drawing in which:

Figure 1 represents a side elevation of an automobile embodying this invention.

Fig. 2 is a front elevation of the indicator.

Fig. 3 is a diagram showing the connections between the indicator and the levers.

In this drawing is shown an automobile $a$ provided with an ordinary clutch pedal lever $b$ and a brake lever $c$ both being within reach of the car operator's foot. A flexible cable or chain $d$ is connected to the clutch lever for controlling the speed of the vehicle. This connection has a loop or bight $e$ to give a certain degree of slackness to the connection and take up some of the motion of the clutch lever. This connection is guided about idler rollers $f$ secured to the chassis or frame of the car.

A taut cable $g$ branches from the main cable and is connected to the brake lever for stopping the travel of the car. This cable is guided over an idler roller $h$ arranged on the frame.

An indicator plate $i$ is secured to the rear body portion of the car, and on this plate is inscribed from the bottom to the top the words "Speed," "Slow" and "Stop." The plate carries on one side a casing $j$, and pivoted at $k$ in the casing is a swinging signal arm $m$ adapted to normally point toward the word "Speed" on the indicator plate. The signal arm is partly housed in the casing but a portion of it projects beyond one end of the casing to be visible. A spring $n$ will restore the signal arm to its normal position and a stop $o$ limits the movement of the said arm.

As shown in the drawing the cable $d$ is attached to one end of the signal arm so that if either of the levers is actuated by the foot of the chauffeur the arm will swing and point to one of the designations on the signal plate. In view of the fact that the cable $g$ is taut the lever $c$ although moving the same distance or arc relative to the clutch lever, will swing the signal arm a greater distance and point to the word "Stop" on the sign. The signal arm is thus given variable movement by two levers having the same travel with a single cable attachment to the arm.

Each pedal lever can be provided with a clip $p$ as indicated in Fig. 1, and it is adjustable along the lever so that either one of the flexible connections can be fixed in any desired position relative to the fulcrum and power of the levers to give more or less motion to the signal arm.

I claim:

1. In a vehicle signal the combination with a signal plate having inscriptions thereon, of an indicator arm swingingly mounted on the plate, a pair of pedal levers with uniform movement, flexible connections between the arm and pedal levers one being taut and the other slacked, said levers when operated being adapted to transmit variable motion to the indicator arm.

2. In a vehicle signal the combination with a signal plate having the words "Stop," "Slow" and "Speed" inscribed thereon, of an indicator arm swingingly mounted on the plate normally set at "Speed," a pair of pedal levers with uniform movement, flexible connections between the arm and pedal levers one being branched, one of the said pedal levers when operated being adapted to swing the signal arm to the word "Slow," and the other to the word "Stop."

3. In a vehicle signal the combination with a signal plate having the words "Stop," "Slow" and "Speed" inscribed thereon, of an indicator arm swingingly mounted on the plate normally set at "Speed," a pair of pedal levers with uniform movement, flexible connections between the arm and pedal levers one being branched, means for adjusting the connections to vary the movement of the signal arm, one of the said pedal levers when operated swinging the signal arm to the word "Slow," and the other to the word "Stop."

4. In a vehicle signal the combination with a signal plate having the words "Stop," "Slow" and "Speed" inscribed thereon, of an indicator arm swingingly mounted on the plate normally set at "Speed," a pair of pedal levers with uniform movement, flexible connections between the arm and pedal levers one being branched, means relative to the levers for adjusting the connections to vary the movement of the signal arm, one of the said pedal levers when operated swinging the signal arm to the word "Slow," and the other to the word "Stop."

In testimony whereof I have hereunto set my hand in the presence of two subscribing witnesses.

MICHAEL BLASIUS.

Witnesses:
   WM. E. WARLAND,
   WILLIAM MILLER.